Oct. 9, 1956
C. E. FRUIT
2,765,532
PACKAGE BAND CUTTER
Filed July 16, 1954
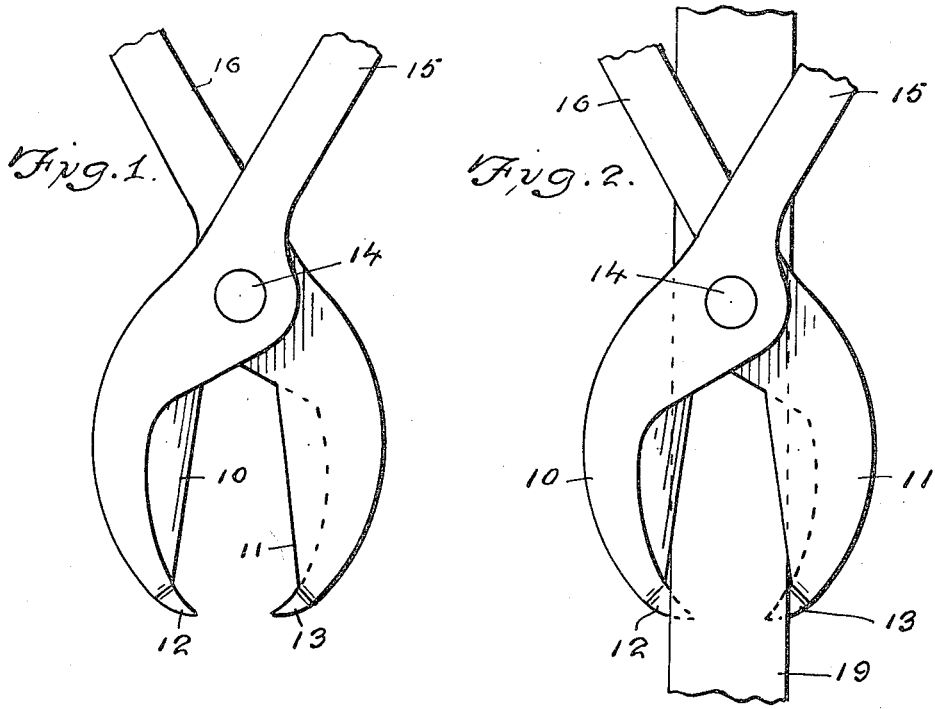
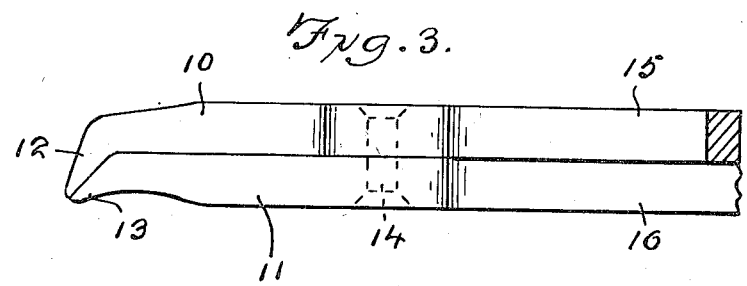
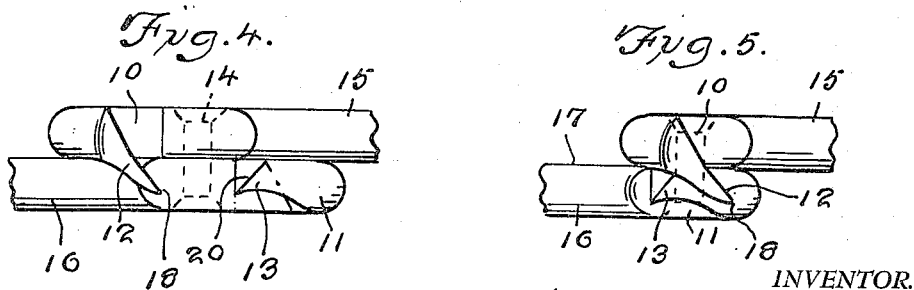
INVENTOR.
Charles E. Fruit
BY Victor J. Evans &Co.
ATTORNEYS

United States Patent Office 2,765,532
Patented Oct. 9, 1956

2,765,532

PACKAGE BAND CUTTER

Charles E. Fruit, Sharon, Pa.

Application July 16, 1954, Serial No. 443,787

2 Claims. (Cl. 30—254)

This invention relates to devices for cutting steel bands or straps used around packages, cartons and containers, and in particular, a tool resembling a pair of shears having pivotally connected handles with nibs on the ends of blades adapted to be actuated in shearing relation by the handles whereby with the nibs extended over a steel strap or band the strap is retained in position for cutting by the blades.

The purpose of this invention is to provide means for shearing steel bands or straps around packages, cartons and other containers without the necessity of forcing a blade of a shear under the strap and then turning the shear into a position perpendicular to the strap for cutting.

Numerous types of packages, cartons and other containers are secured, generally compressed with steel bands or straps that are applied and cinched to holding positions by mechanical means, and it is difficult to cut or break the bands without damaging the cartons or wrappers or goods or materials in the packages, cartons or the like. In order to cut a steel band or strap that is tight around a package, it is necessary to force a cutting blade under the band and then turn the blade to a cutting position, and in numerous instances this is difficult and sometimes impossible. With this thought in mind, this invention contemplates a pair of shears, such as tinsmith's snips, having nibs extended at the ends of the blades whereby the nibs are readily inserted over steel bands so that the bands may be held in position as the blades are forced therethrough.

The object of this invention is, therefore, to provide means on a pair of shears for retaining cutting blades of the shears in operative relation with steel bands positioned around packages and the like to facilitate cutting the bands.

Another object of the invention is to provide a tool for cutting steel bands and straps positioned around packages and the like in which the tool is adapted to cut bands of the conventional type and also bands of different sizes.

A further object of the invention is to provide a tool having nibs extended from ends of cutting blades to facilitate cutting steel bands and the like in which the tool is of a simple and economical construction.

With these and other objects and advantages in view, the invention embodies a pair of pivotally connected cutting blades with sharp points providing nibs extended toward one side of the shear whereby with the shear positioned against the band the nibs grip opposite edges thereof, preventing the band snapping away from the cutting blades as the blades are forced therethrough.

Other features and advantages of the invention will appear from the following description taken in connection with the drawing, wherein:

Figure 1 is a front elevation view illustrating the blades of the improved steel band-cutting shears.

Figure 2 is a view similar to that shown in Figure 1 illustrating the band-cutting shears with the shears positioned against a steel band and with the nibs extended below the band.

Figure 3 is a side elevational view of the blades the tool showing the positions of the nibs and with the handles broken away.

Figure 4 is an end elevational view of the cutting blades with the blades as shown in Figure 1 and with the handles broken away.

Figure 5 is an end elevational view similar to that shown in Figure 4 and showing the nibs with the blades in the closed position.

Referring now to the drawing wherein like reference characters denote corresponding parts, the improved steel band-cutting snips or shears of this invention includes blades 10 and 11 having nibs 12 and 13, respectively, on extended ends, the blades being pivotally connected with a pin 14 and having handles 15 and 16 extended from the pivotal connection by which the blades are actuated.

The cutting blades 10 and 11 are similar to blades of conventional snips or shears and with the tool in a horizontally disposed position, as illustrated in Figure 3, nibs 12 and 13 extend downwardly with the nib 12 overlapping the nib 13, as illustrated in Figures 3 and 5.

The cutting or shearing edges of the blades 10 and 11 are positioned on a plane, as indicated by the numeral 17, and the lower end or point 18 of the nib 12 extends across the plane whereby with the back of the shears positioned against a steel band, as indicated by the numeral 19, the point 18 will cross the band, coacting with the point 20 of the nib 13 which is positioned below the plane 17 and also below the band.

With the nibs patterned as illustrated and described, it is only necessary to place the tool against a band and open and close the cutting blades with the handles to cut the band and with handles of moderate length the band may be cut with comparatively little effort.

The nibs may also be formed in different designs and may extend straight, parallel to or at any suitable angles in relation to the blades.

It will be understood that modifications, within the scope of the appended claims, may be made in the design and arrangement of the parts without departing from the spirit of the invention.

What is claimed is:

1. In a steel band-cutting tool, the combination which comprises a pair of blades having cutting edges with shanks at one of the ends of the blades and with nibs extended from the opposite ends and said blades being actuated by handles extended from the shanks thereof, and a pin extended through the shanks of the blades pivotally connecting the blades and retaining one blade in shearing relation with the other, both of the nibs on the ends of the blades being extended toward the same side of the tool and the nibs having undulating coacting surfaces.

2. In a steel band-cutting tool, the combination which comprises a pair of blades having cutting edges with shanks at one of the ends of the blades and with nibs extended from the opposite ends and said blades being actuated by handles extended from the shanks thereof, and a pin extended through the shanks of the blades pivotally connecting the blades and retaining one blade in shearing relation with the other, both of the nibs at the ends of the blades being tapered and both extending toward the same side of the tool with the nib of one blade overlapping the nib of the other and the coacting surfaces of the nibs being undulated.

References Cited in the file of this patent

UNITED STATES PATENTS

| D. 53,606 | Rauh | July 15, 1919 |
| 868,706 | Schepman et al. | Oct. 22, 1907 |
| 2,117,224 | Soss | May 10, 1938 |
| 2,240,946 | Vido | May 6, 1941 |

FOREIGN PATENTS

| 258,353 | Great Britain | Sept. 20, 1926 |
| 513,854 | France | Feb. 25, 1921 |